United States Patent
Yamaguchi et al.

(10) Patent No.: US 6,873,586 B2
(45) Date of Patent: Mar. 29, 2005

(54) OPTICAL INFORMATION RECORDING APPARATUS HAVING WRITE BEAM INTENSITY DETECTOR

(75) Inventors: Atsushi Yamaguchi, Tokorozawa (JP); Masahiro Kato, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 483 days.

(21) Appl. No.: 09/855,753

(22) Filed: May 16, 2001

(65) Prior Publication Data

US 2002/0009034 A1 Jan. 24, 2002

(30) Foreign Application Priority Data

May 19, 2000 (JP) ...................................... 2000-148811

(51) Int. Cl.[7] ............................................. G11B 7/00
(52) U.S. Cl. ................ 369/53.26; 369/116; 369/59.11; 369/59.12
(58) Field of Search .......................... 369/53.26, 53.34, 369/53.36, 116, 59.11, 59.12, 59.24, 59.17, 47.5, 120, 121, 47.51, 47.55

(56) References Cited

U.S. PATENT DOCUMENTS

| | | | |
|---|---|---|---|
| 5,163,036 A | 11/1992 | Yokogawa | 369/54 |
| 5,495,466 A * | 2/1996 | Dohmeier et al. | 369/53.36 |
| 5,579,329 A | 11/1996 | Taguchi | 372/38 |
| 5,602,814 A | 2/1997 | Taguchi | 369/58 |
| 6,480,450 B1 * | 11/2002 | Fujii et al. | 369/59.12 |
| 6,636,472 B2 * | 10/2003 | Kobayashi et al. | 369/116 |
| 6,661,759 B1 * | 12/2003 | Seo | 369/59.11 |

FOREIGN PATENT DOCUMENTS

EP        0 802 531        10/1997

* cited by examiner

*Primary Examiner*—Nabil Hindi
(74) *Attorney, Agent, or Firm*—Morgan, Lewis & Bockius LLP

(57) ABSTRACT

A drive pulse for writing is generated based on a data pulse signal to be recorded, a light source element is driven with this drive pulse to obtain a beam of light, and this beam of light is irradiated onto an optical recording medium to record the data pulse signal on the optical recording medium. When the drive pulse is generated, a write pulse is generated based on the data pulse signal, and compared with a beam intensity signal representing intensity of the beam of light to optimally control a pulse width of the drive pulse.

5 Claims, 11 Drawing Sheets

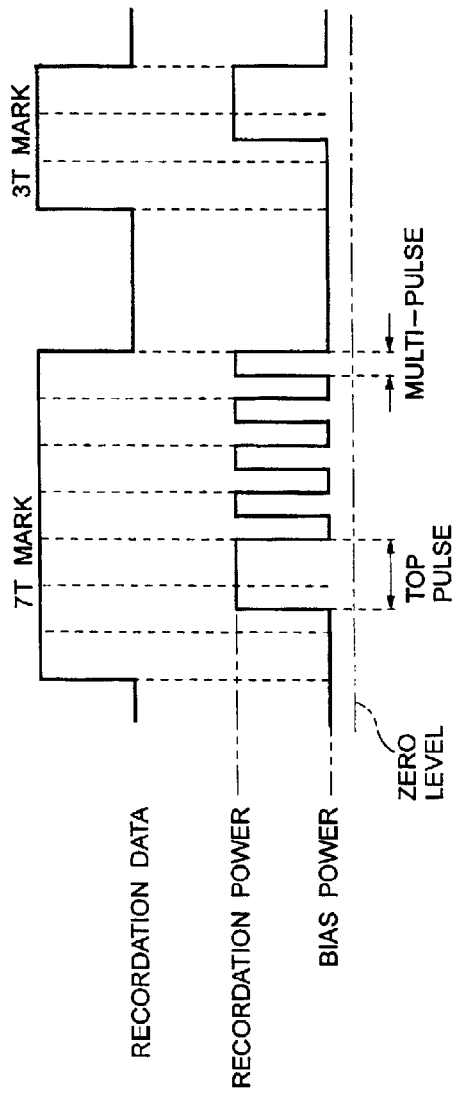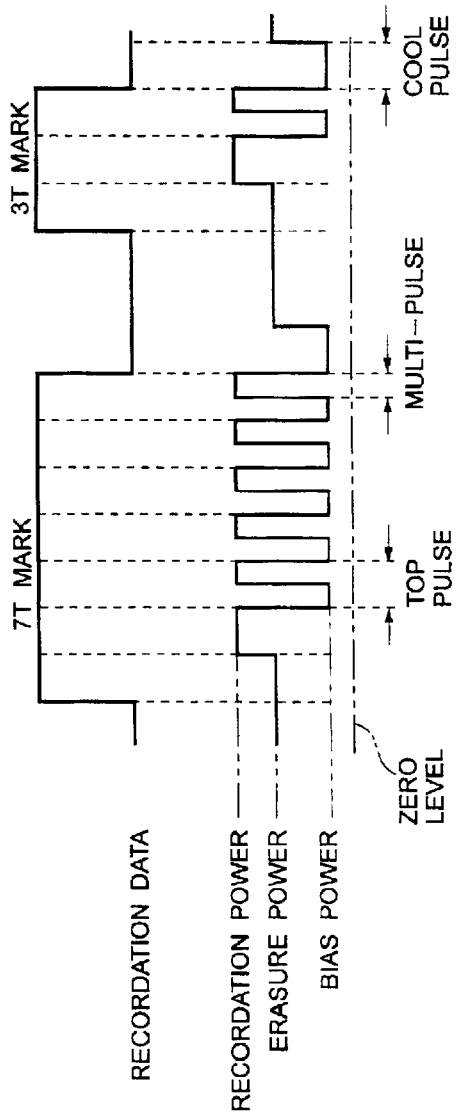

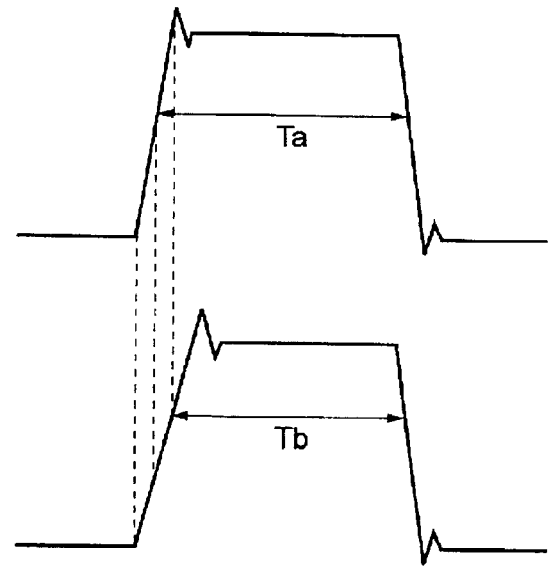
FIG.3A
FIG.3B
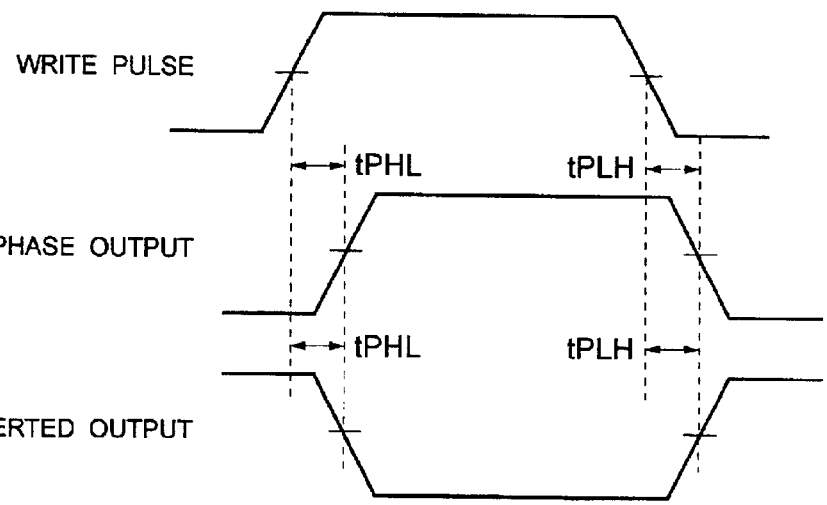
FIG.4A  WRITE PULSE
FIG.4B  IN PHASE OUTPUT
FIG.4C  INVERTED OUTPUT

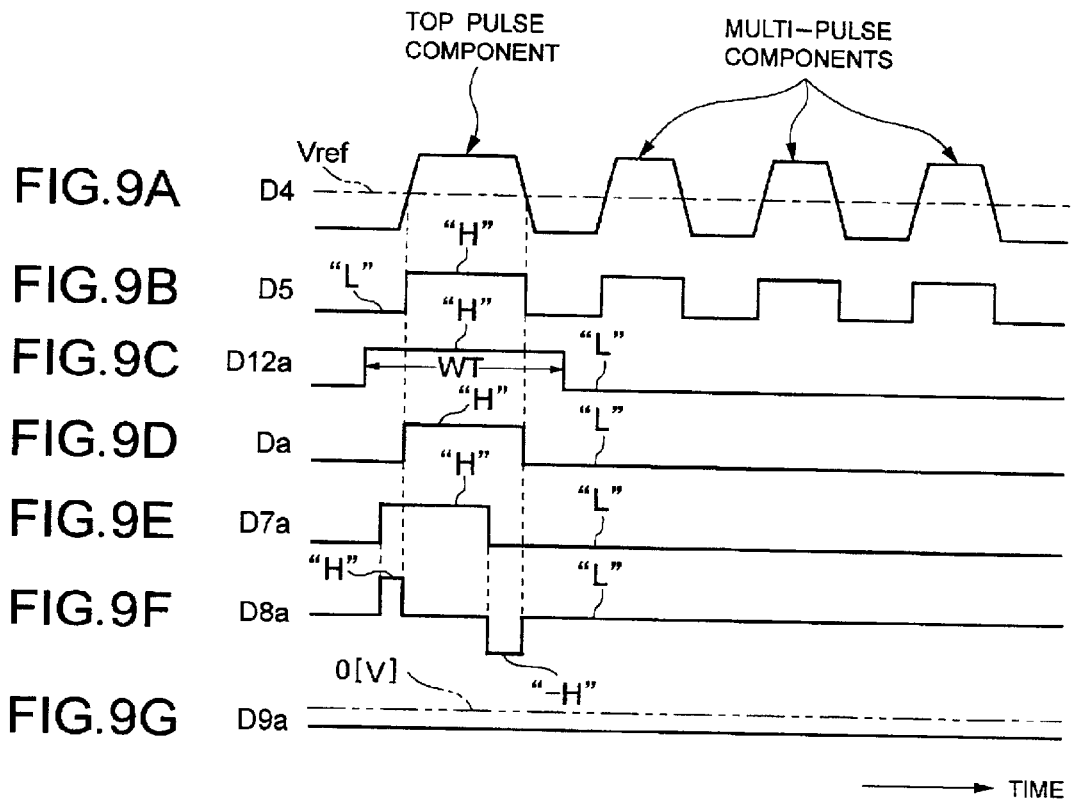
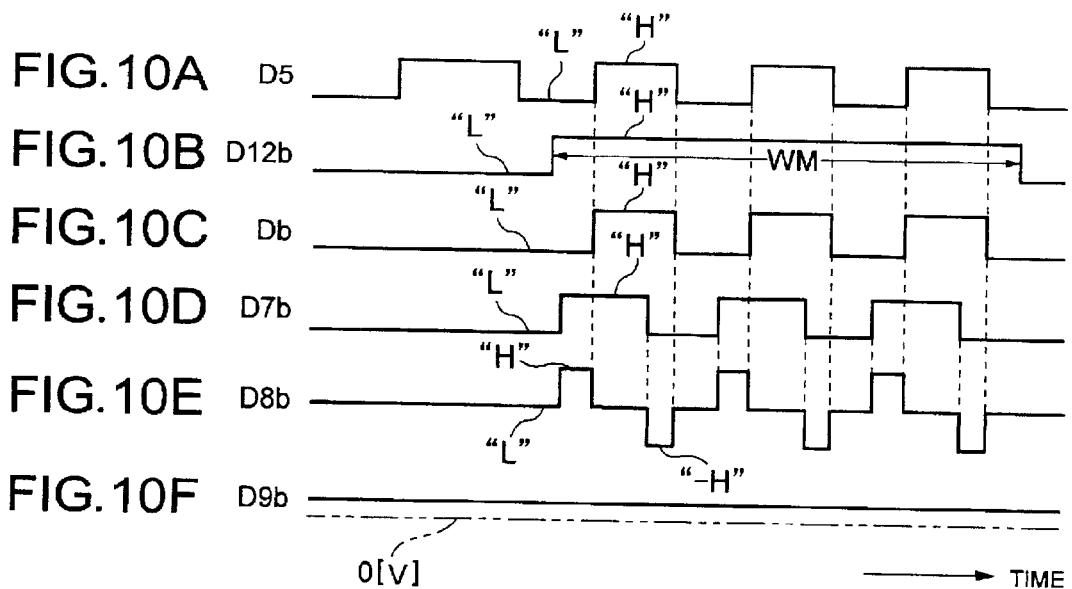

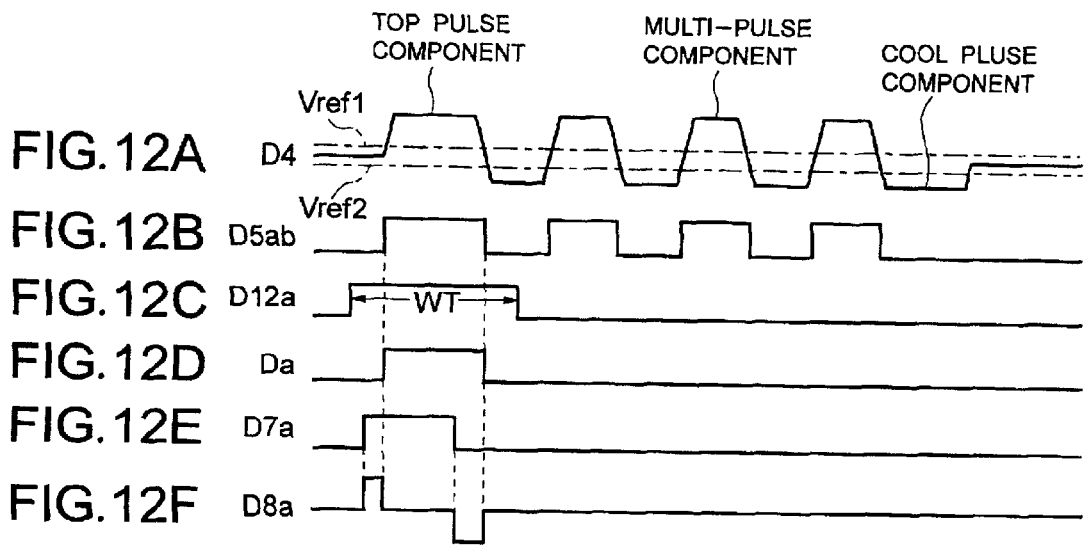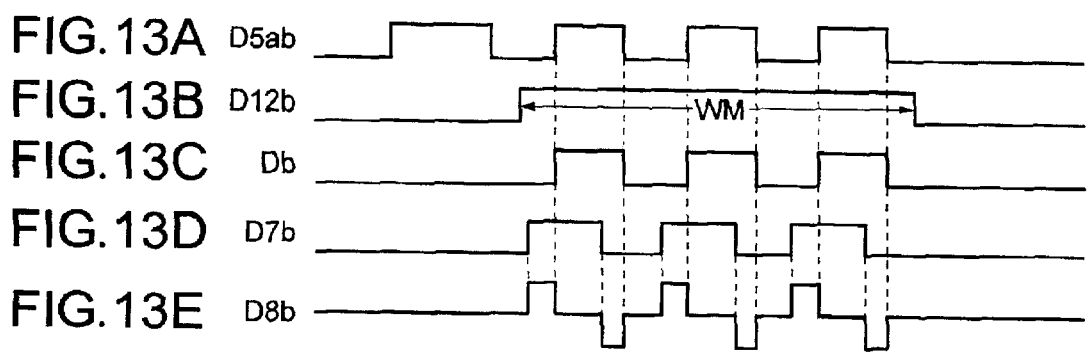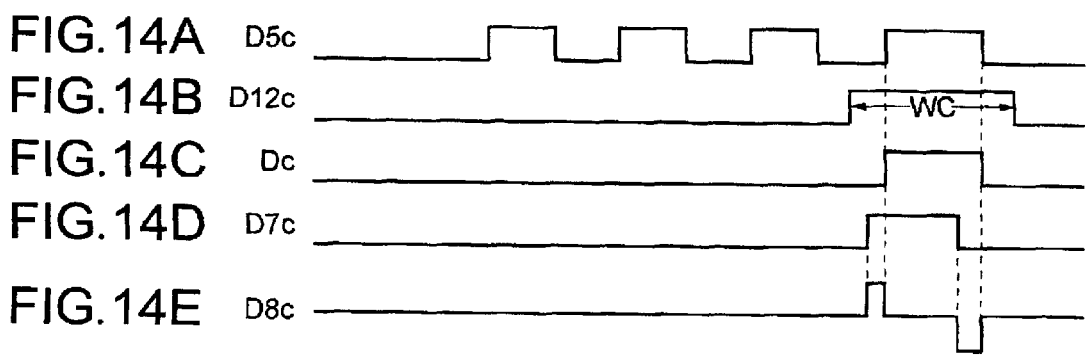

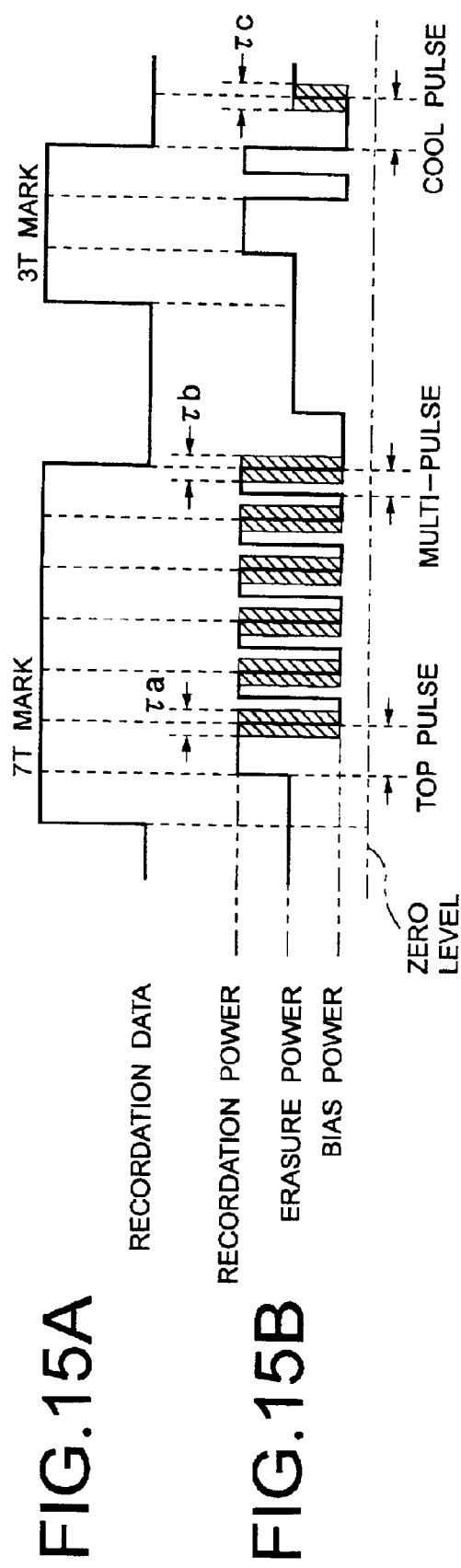

OPTICAL INFORMATION RECORDING APPARATUS HAVING WRITE BEAM INTENSITY DETECTOR

BACKGROUND OF THE INVENTION

1. Field of the Invention

The present invention relates to an optical information recording apparatus for recording a data pulse signal on an optical recording medium.

2. Description of the Related Art

An optical information recording apparatus for writing a data pulse signal consisting of consecutive pairs of mark (indicia) and space on an optical information recording medium such as CD (compact disk) and DVD (digital video disk or digital versatile disk) is known.

In such optical information recording apparatus, a drive power (more specifically, drive current) for a semiconductor laser is on-off controlled in short periods in response to a write command signal to intermittently irradiate a laser beam at short periods, and this laser beam is used as a write beam to be irradiated onto the information recording medium via an optical system.

When, further, information is written on a high density information recording medium such as information writable DVD-R (write once DVD) or DVD-RW (rewritable DVD), for example, control called write pulse strategy is performed to write and form pits having suitable recording characteristics on a recording layer.

FIGS. 1A and 1B of the accompanying drawings illustrate a write pulse strategy employed for DVD-R when information is written on a recording layer made from an organic pigment, and FIGS. 2A and 2B illustrate a write pulse strategy for DVD-RW when information is written on a recording film made from a phase change material.

As shown in FIGS. 1A and 1B, the DVD-R write pulse strategy provides a drive current to be fed to a semiconductor laser corresponding to recordation data in the form of pulse train and produces a write beam corresponding to recordation mark lengths of the recordation data according to a top pulse and subsequent multi-pulses, rather than simply conducting on-off control the drive current to be fed to the semiconductor laser in accordance with amplitude variations of the recordation data.

If the drive current for the semiconductor laser is controlled under such DVD-R write pulse strategy, thermal interference among the organic pigments of the recording layer is suppressed, and it is possible to prevent a rear end of a resulting pit from bulging and becoming like a tear drop due to heat accumulation. This also results in prevention of occurrence of jitter and crosstalk so that the DVD-R write pulse strategy is effective measures to improve recording characteristics.

If the thermal interference occurs, a jitter component tends to appear at the edge of the recordation mark, and if the rear end of the pit bulges and becomes like a teardrop, crosstalk to a neighboring track increases. DVD-R write pulse strategy prevents the thermal interference from occurring and the pit rear end from becoming like a tear drop so that it can prevent the jitter and crosstalk.

In the DVD-RW write pulse strategy, as shown in FIGS. 2A and 2B, a drive current to the semiconductor laser corresponding to the recordation data is given in the form of pulse train, and a write beam corresponding to recordation mark lengths of the recordation data is generated in response to the top pulse, multi-pulses and cool pulse.

If the drive current of the semiconductor laser is controlled on the basis of this DVD-RW write pulse strategy, the laser beam power varies between recordation power and bias power in accordance with the top and multi-pulses, and this variation causes the phase change material of the recording layer to be melt and cooled repeatedly such that amorphous is formed. Further, a laser beam of erasure power is irradiated during periods corresponding to the spaces of the recordation data so that the phase change material is crystallized. In this manner, the drive current of the semiconductor laser is controlled with the top, multi- and cool pulses to form recordation pits thereby improving recordation characteristics.

Conventionally, the characteristics of recordation on the high density information recording medium are improved by controlling the recordation power of the write beam with the above described write pulse strategy or the like. However, since the semiconductor laser element has an individual difference and environmental changes influence the semiconductor laser characteristics, it is sometimes difficult to set the recordation power of the write beam at a suitable power.

When, for example, information is written onto the same information recording media with different pickups, waveforms (time width and intensity) of laser beams emitted from respective semiconductor laser elements are different from each other and it is difficult to have similar recording characteristics on the information recording media even if the semiconductor lasers are driven and controlled on the basis of the same strategy pattern. Specifically, the laser beam emitted from one semiconductor laser according to the common strategy pattern has such a waveform as shown in FIG. 3A, and the laser beam emitted from the other semiconductor laser according to the commom strategy pattern has such a waveform as shown in FIG. 3B. These waveforms are different from each other in rise time, fall time and irradiation period Ta and Tb so that the recordation characteristics on the information recording media are not the same as each other.

When, further, information is written on the same information recording media with the same pickup, characteristics of an optical control circuit, which is an electric circuit, and operation characteristics of the semiconductor laser change because they are influenced by environmental temperature and other factors. This makes it difficult to have uniform recording characteristics on the information recording media which is similar to the case where there are differences between the respective laser elements. Specifically, as shown in FIG. 4A, when a drive current to a semiconductor laser is controlled on the basis of a write pulse, a propagation delay period of the optical control circuit (a period until an in-phase output and inverted output are generated in response to a write pulse; see also FIGS. 4B and 4C) generally varies with the environmental temperature, and a rise time tPLH and a fall time tPHL of the propagation delay period also vary. If, for example, the rise time tPLH increases and the fall time tPHL decreases, the time for the drive current to drive the semiconductor laser becomes shorter and the irradiation time for the laser beam becomes shorter than an intended time period.

Moreover, the environmental temperature may influence not only the semiconductor laser element and optical control circuit, but also other circuits and electronic parts such as power source circuit used to drive the semiconductor laser element and optical control circuit. This results in non-uniform characteristics of the laser beams emitted from the semiconductor lasers and makes it difficult to have the same recordation characteristics on the information recording media.

OBJECTS AND SUMMARY OF THE INVENTION

An object of the present invention is to provide an optical information recording apparatus that can eliminate the above described conventional problems.

According to the present invention, there is provided an optical information recording apparatus adapted to record a data pulse signal constituted by consecutive pairs of mark and space on an optical recording medium, comprising a drive pulse generator for generating a drive pulse in response to the data pulse signal, a light source element for generating a write beam in response to the drive pulse, and an optical system for irradiating the write beam onto the optical recording medium, wherein the drive pulse generator includes a write pulse generator for generating a write pulse signal based on the data pulse signal, a write beam intensity detector for detecting intensity of the write beam and generating a write beam intensity signal representing the detected intensity, an instruction pulse generator for comparing the write pulse signal with the write beam intensity signal and generating an instruction pulse which is obtained by regulating a pulse width of the write pulse in response to a comparison signal representing a result of comparison, and a drive unit for generating the drive pulse in response to the instruction pulse.

With such optical information recording apparatus, a phase difference between a signal representing an actual chronological change of the intensity of the write beam irradiated onto the optical recording medium and the write signal based on the data pulse signal to be written on the recording media is detected, the pulse width of the drive pulse is regulated based on the detected phase difference, and the light source element such as a laser diode is driven with the regulated drive pulse.

If the characteristics of the light source element and/or parts of the recording apparatus vary with the environmental temperature and/or aging, and discrepancy correspondingly arises between the actual write beam and the original write information, the drive pulse width is adjusted with the actual write beam variation such that the light source is optimally driven in such a manner that is free from influence by the changing environmental temperature and aging, thereby improving the recording characteristics to the information recording medium.

BRIEF DESCRIPTION OF THE DRAWINGS

FIGS. 1A and 1B illustrate a write pulse strategy for DVD-R;

FIGS. 2A and 2B illustrate a write pulse strategy for DVD-RW;

FIGS. 3A and 3B are diagrams for explaining a problem caused by differences in characteristics between conventional semiconductor lasers;

FIGS. 4A to 4C are diagrams for explaining a problem caused by, for example, temperature dependency of a conventional semiconductor laser;

FIGS. 9A to 9G and 10A to 10F illustrate timing charts to describe an operation of the optical control circuit shown in FIG. 8;

FIGS. 12A to 12F, 13A to 13E and 14A to 14E depict timing charts to describe an operation of the optical control circuit shown in FIG. 11;

FIGS. 15A and 15B illustrate signals compensated by the optical control circuit shown in FIG. 11.

DETAILED DESCRIPTION OF THE EMBODIMENTS

Embodiments of the present invention will now be described in reference to FIGS. 5 through 16.

First Embodiment

Figure 5:
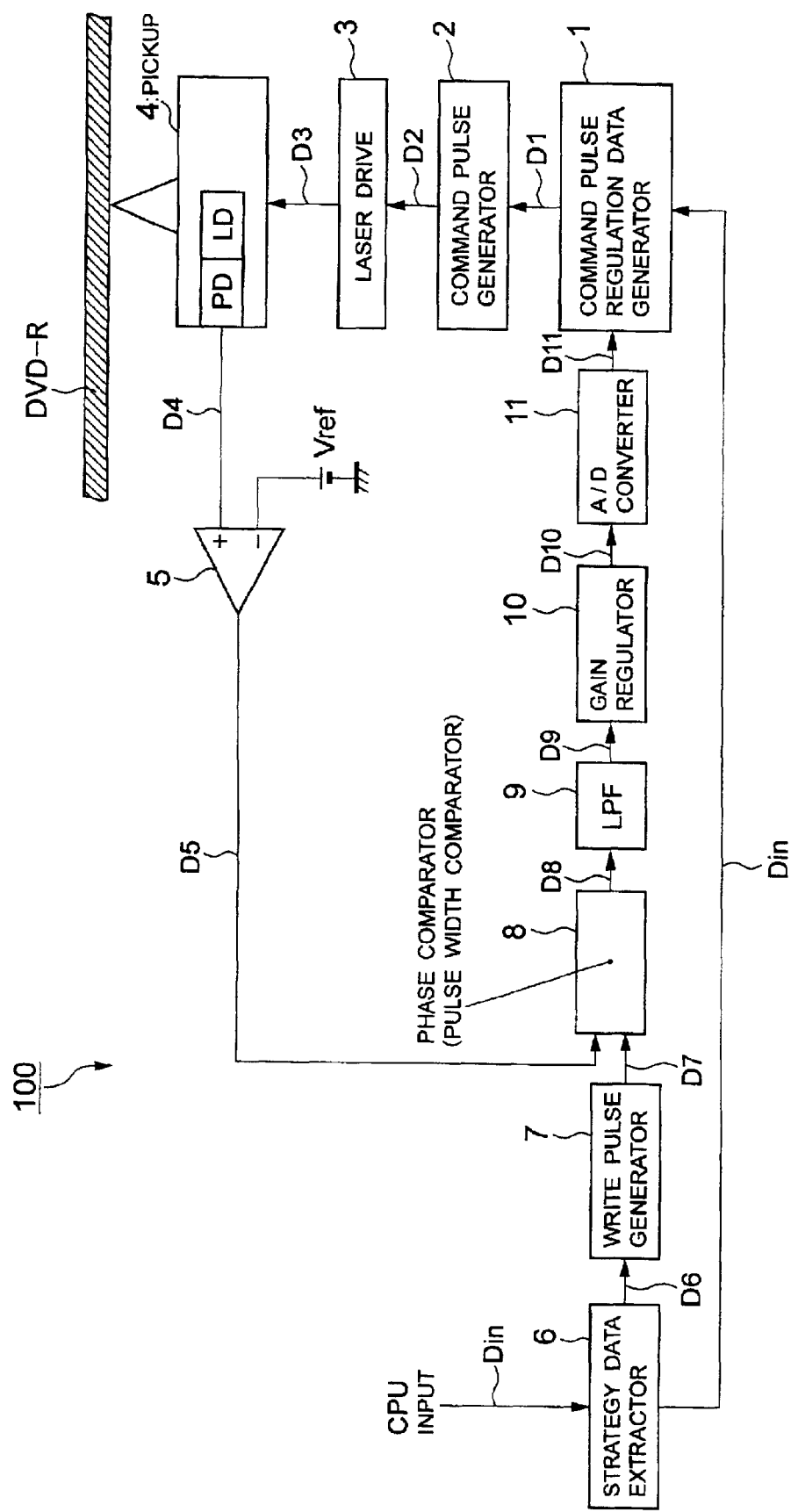
FIG. 5 is a block diagram showing a structure of an optical control circuit according to a first embodiment.
Figure 6:
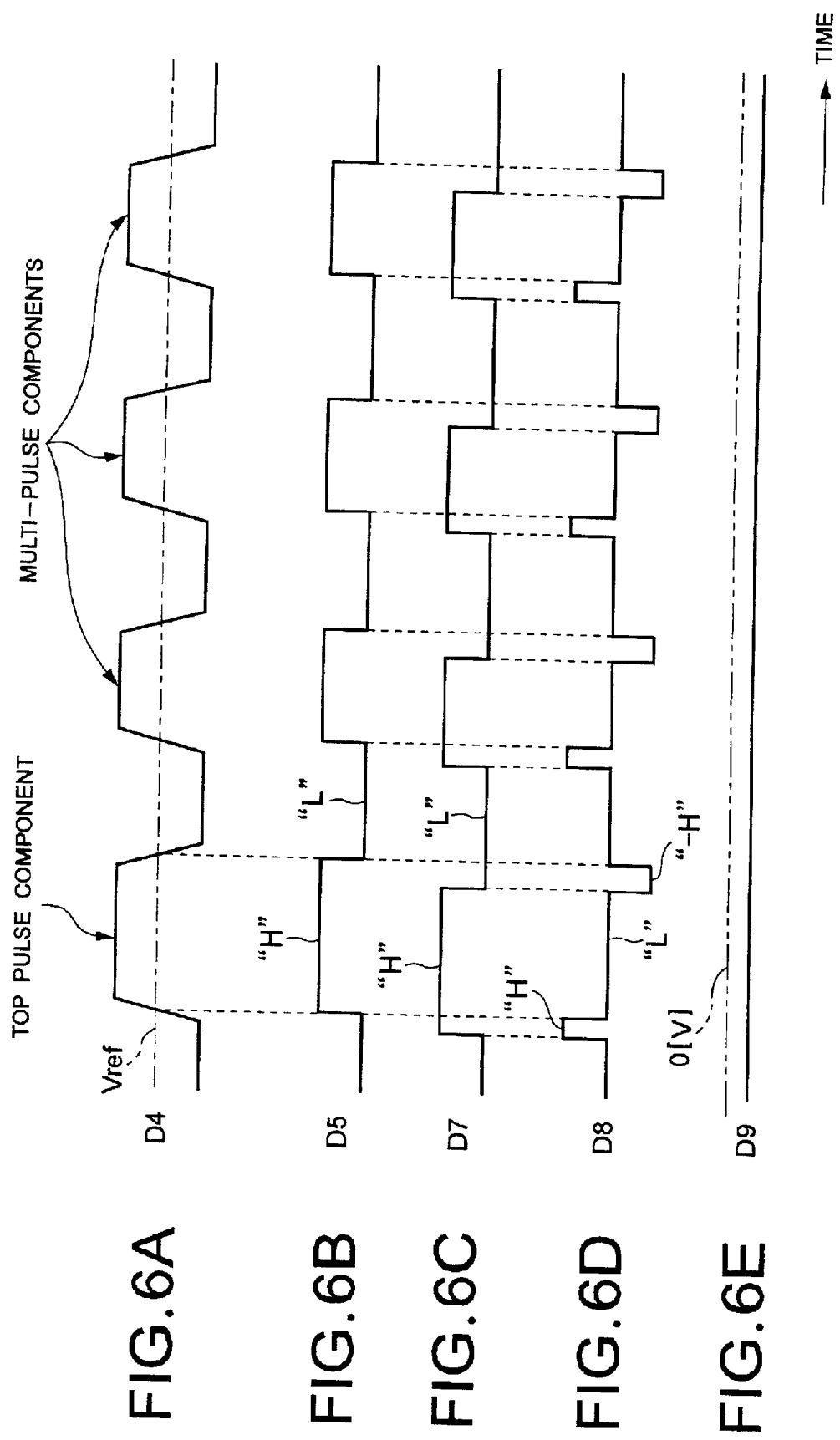
FIGS. 6A to 6E illustrate timing charts to describe an operation of the optical control circuit shown in FIG. 5.
Figure 7:
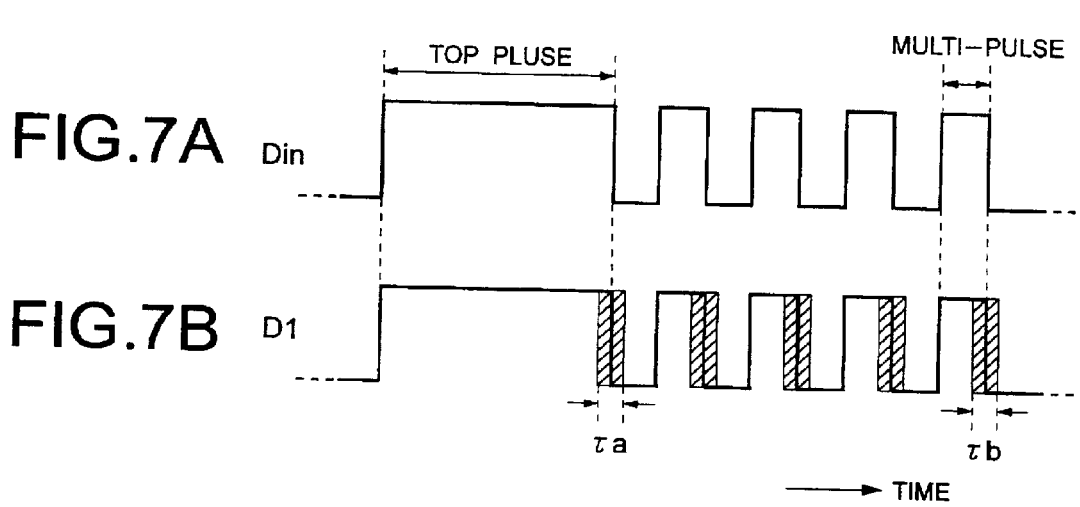
FIGS. 7A and 7B illustrate signals compensated by the optical control circuit shown in FIG. 1.

Referring to FIG. 5, illustrated is a block diagram of an optical control circuit 100 for controlling a semiconductor laser incorporated in a pickup of a write device adapted to write information on DVD-R, which is an information recording medium.

In this illustration, the optical control circuit 100 includes the pickup 4, a laser drive 3 and a recordation pulse generator 2. Although not shown, the write device includes a drive mechanism to rotate DVD-R at a predetermined linear velocity while keeping DVD-R at a predetermined clamp position during an information writing operation. The write device also includes a micro computer system having a micro processor (CPU) to perform centralized control over its operation.

The recordation pulse generator 2 generates a recordation pulse signal D2 based on a compensated recordation pulse data D1 supplied from a data generator for recordation pulse regulation 1, which is a regulation means, and feeds it to the laser drive 3. Specifically, the compensated recordation pulse data D1 includes data specifying at least an amplitude and pulse width of the recordation pulse signal D2, and when this compensated recordation pulse data D1 is fed to the recordation pulse generator 2, a recordation pulse signal D2 having the specified amplitude and pulse width is produced and output. In short, the recordation pulse generator 2 generates and outputs the recordation pulse signal D2 in accordance with the compensated recordation pulse data D1 which is digital data.

The laser drive 3 has a variable current source including a current mirror circuit or the like, and controls an output current (drive current) D3 of the variable current source in response to variations of the recordation pulse signal amplitude. Thus, the laser drive feeds the drive current D3 to the pickup 4 in proportion to the amplitude of the recordation pulse signal D2.

The pickup 4 includes an optical system (not shown), a semiconductor laser LD that accepts the drive current D3 from the laser drive 3, and a light receiving element or photo detector PD such as a photo diode located adjacent to the semiconductor laser LD. A laser beam radiated from the semiconductor laser LD is directed to a recording film of DVD-R through the optical system thereby to write information. The light receiving element PD detects part of the laser beam emitted from the semiconductor laser LD on the real time basis, and outputs the detection output as a monitoring signal D4. In other words, the light receiving element PD outputs the monitoring signal D4 that represents intensity of the laser beam irradiated on DVD-R.

The optical control circuit 100 further includes a binary circuit 5 which serves as signal generating means, a strategy data extractor 6, the recordation pulse generator 7, a phase comparator 8, a low-pass filter 9, a gain regulator 10 and an A/D converter 11.

The binary circuit 5 is a comparator that compares the monitoring signal D4 with a constant reference voltage Vref generated by a predetermined constant voltage source, and produces and outputs a binary signal D5. That is, the binary circuit 5 outputs a logic "H" as the binary signal D5 when the monitoring signal D4 is equal to or greater than the reference voltage Vref (D4≧Vref), and a logic "L" when the monitoring signal D4 is smaller than the reference voltage Vref (D4<Vref). In other words, the binary circuit 5 generates and outputs the binary signal D5 that represents the chronological change of intensity of the laser beam actually irradiated to DVD-R from the semiconductor laser LD.

The strategy data extractor 6 receives recordation data Din of the strategy pattern supplied from the computer system, extracts the top and multi-pulses included in the recordation data Din, as shown in FIG. 7A, and produces and outputs digital data D6 representing generation timing, pulse widths and amplitudes of the top and multi-pulses.

Specifically, as the computer system accepts digital data such as music data and computer programs, it converts the digital data to the recordation data Din of the strategy pattern as shown in FIG. 7A based on a predetermined write pulse strategy, and feeds it to the strategy data extractor 6. The strategy data extractor 6 produces and outputs the digital data D6 that represents generation timing, pulse widths and amplitudes of the top and multi-pulses from the recordation data Din of the strategy pattern.

The strategy data extractor 6 also transfers the recordation data Din of the strategy pattern given from the computer system directly to the recordation pulse regulation data generator 1.

The recordation pulse generator 7 produces top and multi-pulses each being binary as shown in FIG. 7A based on the digital data D6 from the strategy data extractor 6, and outputs a signal comprised of these top and multi-pulses as a recordation pulse signal D7. In other words, the recordation pulse generator 7 is a signal generation means for producing and outputting the ideal binary recordation pulse signal D7 based on the predetermined write pulse strategy.

The phase comparator 8 compares the level of the binary signal D5 from the binary circuit 5 with that of the recordation pulse signal D7 from the recordation pulse generator 7 every time it receives the signals D5 and D7, detects a period during which both the signals D5 and D7 have the logic "H" and a period during which both the signals D5 and D7 have the logic "L", so as to produce a detection signal D8.

Specifically, the phase comparator 8 is a decoder circuit, and as shown in FIG. 6D, outputs a logic "H" as the detection signal D8 when the binary signal D5 is a logic "L" and the recordation pulse signal D7 is a logic "H", a logic "L" when the binary signal D5 and recordation pulse signal D7 are both a logic "H", a logic "–H" when the binary signal D5 is a logic "H" and the recordation pulse signal D7 is a logic "L", and a logic "L" when the binary signal D5 and the recordation pulse signal D7 are both a logic "L".

The logic "H" is a predetermined voltage of positive polarity, the logic "L" is a ground voltage, and the logic "–H" is a predetermined voltage of negative polarity having the same absolute value as the logic "H".

Accordingly, the period during which the detection signal D8 takes the logic "L" between the logic "H" and "–H" is detected as a period during which the binary signal D5 and the recordation pulse signal D7 both have the logic "H". Further, the period during which the detection signal D8 takes the logic "L" between the logics "–H" and "H" is detected as a period during which the binary signal D5 and the recordation pulse signal D7 both have the logic "L". Moreover, a phase difference between the binary signal D5 and recordation pulse signal D7 is detected from the period during which the detection signal D8 takes the logic "–H" or "H".

The low-pass filter 9 smoothes the detection signal D8 and outputs a DC smoothed signal D9. For example, as illustrated in FIG. 6E, the smoothed signal D9 is output in response to the changing detection signal D8, with the ground level (0V) being a reference.

The gain regulator 10 is, for example, a variable gain voltage amplifier, and amplifies the smoothed signal D9 of trace level to a signal processable level and outputs an amplified smoothed signal D10.

The A/D converter 11 performs an analog-digital conversion the smoothed signal D10 and outputs a smoothed data D11 representing a value proportional to the smoothed signal D10.

Upon receiving the smoothed data D11, the recordation pulse regulation data generator 1 compensates the top and multi-pulses among the recordation data Din with the smoothed data D11, and feeds the compensated recordation pulse data D1 to the recordation pulse generator 2.

The recordation pulse regulation data generator 1 generates the compensated recordation pulse data D1 in the following manner. As the recordation data Din shown in FIG. 7A is supplied to the recordation pulse regulation data generator 1 via the strategy data extractor 6, a period τa at the end of the top pulse and a period τb at the end of each multi-pulse in the recordation data Din are regulated (increased or decreased) respectively by an amount of time proportional to the value of the smoothed data D11 from the A/D converter 11. This increasing/decreasing regulation is conducted by a digital calculation, and the period-regulated data is supplied to the recordation pulse generator 2 as the compensated recordation pulse data D1 as shown in FIG. 7B.

Therefore, the recordation pulse generator 2 outputs the recordation pulse signal D2 having the top and multi-pulses of which end periods τa and τb are adjusted based on the value of the smoothed data D11. Further, the laser drive 3 outputs the drive current D3 having a waveform analogous to the recordation pulse signal D2 and feeds it to the semiconductor laser LD.

Next, an operation of the optical control circuit 100 shown in FIG. 5 will be described in reference to FIGS. 6A to 6E, 7A and 7B.

When information is written in accordance the write pulse strategy, and the semiconductor laser LD irradiates the laser beam for information recording based on the drive current D3 from the laser drive 3, the light receiving element PD detects part of this laser beam and outputs the monitoring signal D4 (FIG. 6A) representing the change of the laser beam intensity. This monitoring signal D4 is compared with the reference voltage Vref in the binary circuit 5, and converted to the binary signal D5 (FIG. 6B) which is supplied to the phase comparator 8. The phase comparator 8 also receives the ideal recordation pulse signal D7 (FIG. 6C) from the recordation pulse generator 7.

The phase comparator 8 compares the phase of the ideal recordation pulse signal D7 with that of the binary signal D5 obtained from the information recordation laser beam actually irradiated from the semiconductor laser LD to detect the phase difference, and outputs the detection signal D8 (FIG. 6D) representing the phase difference.

The low-pass filter 9 smoothes this detection signal D8 to produce the smoothed signal D9 (FIG. 6E). After passing through the gain regulator 10, the smoothed signal D9 is converted to the smoothed data D11 by the A/D converter 11, and supplied to the recordation pulse regulation data generator 1.

The recordation pulse regulation data generator 1 regulates the recordation data Din with the smoothed data D11, generates the compensated recordation pulse data D1 and supplies it to the recordation pulse generator 2, as described above.

Since the ideal recordation pulse signal D7 is substantially the same as the recordation data Din, regulating the recordation data Din based on the smoothed data D11 is equivalent to regulating the ideal recordation pulse signal D7 based on the smoothed signal D10.

Therefore, the compensated recordation pulse data D1 is supplied to the recordation pulse generator 2, the recordation pulse signal D2 generated by the recordation pulse generator 2 using the compensated recordation pulse data D1 is supplied to the laser drive 3, and the laser drive 3 supplies the drive current D3 to the semiconductor laser LD. In other words, as illustrated in FIG. 7B, the drive current D3 that has the top and multi-pulses of which end periods τa and τb are adjusted via the feed-back operation based on the phase difference is supplied to the semiconductor laser LD.

As a result, even if the characteristics of the semiconductor laser LD change under the influence of the environmental temperature variation or the like, the electric characteristics of the electronic elements of the control circuit 100 change under the influence of the environmental temperature variation or the like, and/or the semiconductor laser LD and electronic elements change due to aging, the periods τa and τb at the ends of the top and multi-pulses are adjusted by the above described feed-back control, and the light emission period of the semiconductor laser LD is appropriately controlled with the adjusted drive current D3, whereby the thermal interference in the organic pigments (recording layer) provided on the DVD-R is suppressed, the rear end of the formed pit is prevented from bulging and becoming like a tear drop, and other problems are also eliminated.

In addition, even if write devices are manufactured using semiconductor lasers LD having individual differences, the respective semiconductor lasers LD are driven with the drive current D3 which is feed-back controlled in the above described manner, so that the influence of the individual differences is reduced and uniform recording characteristics are obtained in DVD-R. Thus, it is feasible to provide write devices of uniform quality.

Second Embodiment

A second embodiment of the present invention will be described in reference to FIGS. 8 through 9G.

Figure 8:
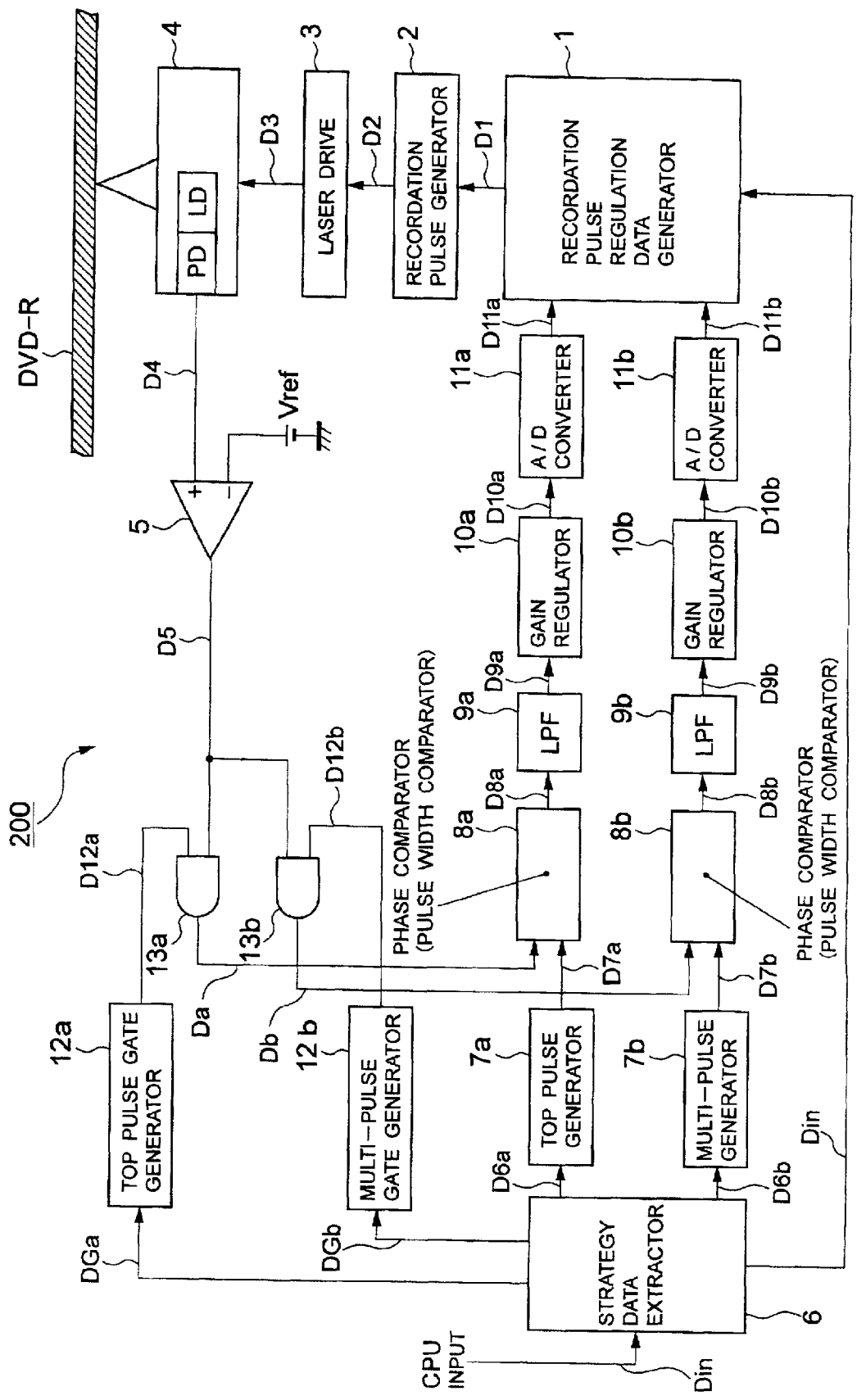
FIG. 8 is a block diagram showing a structure of an optical control circuit according to a second embodiment.

FIG. 8 is a block diagram showing a structure of an optical control circuit 200 according to this embodiment, and similar reference numerals are assigned to similar elements in FIGS. 5 and 8.

Differences between the optical control circuit 200 shown in FIG. 8 and the optical control circuit 100 shown in FIG. 1 lie in that the optical control circuit 200 includes a top pulse generator 7a and a multi-pulse generator 7b as signal generation means, and these pulse generators entail phase comparators 8a and 8b, low-pass filters 9a and 9b, gain regulators 10a and 10b, and A/D converters 11a and 11b respectively.

Moreover, the optical control circuit 200 includes a top pulse gate generator 12a, a multi-pulse gate generator 12b, and AND circuits 13a and 13b.

The strategy data extractor 6 of this embodiment accepts the recordation data Din of the strategy pattern, extracts the top pulse and multi-pulses shown in FIG. 7A, which are included in the recordation data Din, and generates and outputs digital data D6a representing the generation timing, pulse width and amplitude of the top pulse and digital data D6b representing the generation timing, pulse width and amplitude of the multi-pulses.

The top pulse generator 7a only generates a top pulse as shown in FIG. 7A based on the digital data D6a from the strategy data extractor 6, and outputs it as a recordation top pulse signal D7a. In other words, the top pulse generator 7a generates and outputs an ideal recordation top pulse signal D7a based on the predetermined write pulse strategy.

The multi-pulse generator 7b only generates multi-pulses as shown in FIG. 7A based on the digital data D6b from the strategy data extractor 6, and outputs them as a recordation multi-pulse signal D7b. In other words, the multi-pulse generator 7b generates and outputs an ideal recordation multipulse signal D7b based on the predetermined write pulse strategy.

The top pulse gate generator 12a accepts a top pulse gate data DGa from the strategy data extractor 6, and generates and outputs a top pulse gate signal D12a in synchronization with the recordation top pulse signal D7a based on the data DGa. In other words, the strategy data extractor 6 outputs the digital data representing the top pulse D6a and the top pulse gate data DGa, and this top pulse gate data DGa is a data representing a generation period of the recordation top pulse signal D7a.

The top pulse gate generator 12a generates and outputs a top pulse gate signal D12a that becomes a logic "H" in a period WT including the generation period of the recordation top pulse signal D7a based on the top pulse gate data DGa.

The multi-pulse gate generator 12b receives a multi-pulse gate data DGb from the strategy data extractor 6, and generates and outputs a multi-pulse gate signal D12b in synchronization with the multi-pulse signal D7b based on the multi-pulse gate data DGb. In other words, the strategy data extractor 6 outputs the digital data D6b and the multi-pulse gate data DGb, and this multi-pulse gate data DGb is data representing a generation period of the recordation multi-pulse signal D7b.

The multi-pulse gate generator 12b generates and outputs a multi-pulse gate signal D12b that becomes a logic "H" in a period WM including the generation period of the recordation multi-pulse signal D7b based on the multi-pulse gate data DGb.

The AND circuit 13a obtains a logical product of the binary signal D5 from the binary circuit 5 and the top pulse gate signal D12a to produce and output the binary signal (referred to as "top detection signal" hereinafter) Da representing a top pulse component included in the binary signal D5.

The AND circuit 13b obtains a logical product of the binary signal D5 from the binary circuit 5 and the multi-pulse gate signal D12b to produce and output the binary signal (referred to as "multi detection signal" hereinafter) Db representing a multi-pulse component included in the binary signal D5.

A first route including the phase comparator 8a, low-pass filter 9a, gain regulator 10a and A/D converter 11a has fundamentally the same structure as a second route including the phase comparator 8b, low-pass filter 9b, gain regulator 10b and A/D converter 11b. Further, the first and second routes have fundamentally the same structure as a route including the phase comparator 8, low-pass filter 9, gain regulator 10 and A/D converter 11 shown in FIG. 5.

The phase comparator 8a detects a phase difference between the recordation top pulse signal D7a and top detection signal Da and outputs a detection signal D8a. The low-pass filter 9a smoothes the detection signal D8a and outputs a smoothed signal D9a. The gain regulator 10a amplifies the smoothed signal D9a to another smoothed signal D10a of signal processable level and outputs it. The A/D converter 11a converts the smoothed signal D10a to digital smoothed data D11a and supplies it to the recordation pulse regulation data generator 1.

The phase comparator 8b detects a phase difference between the recordation multi-pulse signal D7b and multi detection signal Db and outputs a detection signal D8b. The low-pass filter 9b smoothes the detection signal D8b and outputs a smoothed signal D9b. The gain regulator 10b amplifies the smoothed signal D9b to another smoothed signal D10b of signal processable level and outputs it. The A/D converter 11b converts the smoothed signal D10b to digital smoothed data D11b and supplies it to the recordation pulse regulation data generator 1.

An operation of the optical control circuit 200 having the above described structure will be described in reference to FIGS. 9A to 10F. FIGS. 9A to 9G are timing charts to describe a correction process made to the top pulse, and FIGS. 10A to 10F are timing charts to describe a correction process to the multi-pulse.

At the time of information writing based on the write pulse strategy, if the semiconductor laser LD irradiates a laser beam for information writing according to the drive current D3 from the laser drive 3, the light receiving element PD detects part of this laser beam and outputs a monitoring signal D4 representing change of intensity of the laser beam as shown in FIG. 9A. The monitoring signal D4 is compared with the reference voltage Vref in the binary circuit 5 and converted to the binary signal D5 as shown in FIGS. 9B and 10A before supplied to the AND circuits 13a and 13b.

The A/D circuits 13a and 13b receive the top pulse gate signal D12a and multi-pulse gate signal D12b. As a result, the AND circuit 13a outputs the top detection signal Da representing the logical product of the top pulse gate signal D12a and the binary signal D5, as shown in FIG. 9D, and feeds it to the phase comparator 8a. On the other hand, the AND circuit 13b outputs the multi detection signal Db representing the logical product of the multi-pulse gate signal D12b and the binary signal D5, as shown in FIG. 10D, and feeds it to the phase comparator 8b.

The phase comparator 8a detects a phase difference between the top detection signal Da and the recordation top pulse signal D7a and outputs a detection signal D8a as shown in FIG. 9F. This detection signal D8a is smoothed to a smoothed signal D9a (FIG. 9G) and in turn to a smoothed signal D10a, which is then converted to a smoothed data D11a and fed to the recordation pulse regulation data generator 1.

The phase comparator 8b detects a phase difference between the multi detection signal Db and the recordation multi-pulse signal D7b and outputs a detection signal D8b as shown in FIG. 10E. This detection signal D8b is smoothed to a smoothed signal D9b (FIG. 10F) and in turn to a smoothed signal D10b, which is then converted to a smoothed data D11b and fed to the recordation pulse regulation data generator 1.

The recordation pulse regulation data generator 1 regulates top pulse data included in the recordation data Din based on the smoothed data D11a and regulates multi-pulse data included in the recordation data Din based on the smoothed data D11b. Consequently, like the one illustrated in FIGS. 7A and 7B, a compensated recordation pulse data D1 of which top pulse end period τa and multi-pulse end period τb are regulated is generated and fed to the recordation pulse generator 2.

As the recordation pulse generator 2 generates the recordation pulse signal D2 based on the compensated recordation pulse data D1 and supplies it to the laser drive 3, and the laser drive 3 supplies the drive current D3 to the semiconductor laser LD, the semiconductor laser LD irradiates the laser beam in accordance with the compensated recordation pulse data D1.

As described above, like the first embodiment, this embodiment regulates the periods τa and τb at the top and multi-pulse ends by way of the above described feed back control and appropriately controls the irradiation periods of the semiconductor laser LD with the regulated drive current D3 so that the thermal interference among the organic pigments (recording layer) provided in DVD-R is suppressed and the rear end of the resulting pit does not bulge or become like a tear drop even if the characteristics of the semiconductor laser LD and those of the electronic parts and elements of the optical control circuit 200 vary with the environmental temperature and aging.

In addition, even when the write devices are manufactured using semiconductor lasers LD having individual differences, it is possible to suppress influence of the individual differences by driving the respective semiconductor lasers LD with the drive current D3 regulated by the above described feedback control so that DVD-R have uniform recording characteristics. Accordingly, it is feasible to provide write devices of uniform quality.

Third Embodiment

Now, a third embodiment will be described in reference to FIGS. 11, 12A to 12F, 13A to 13E, 14A to 14E and 15A to 15B.

Figure 11:
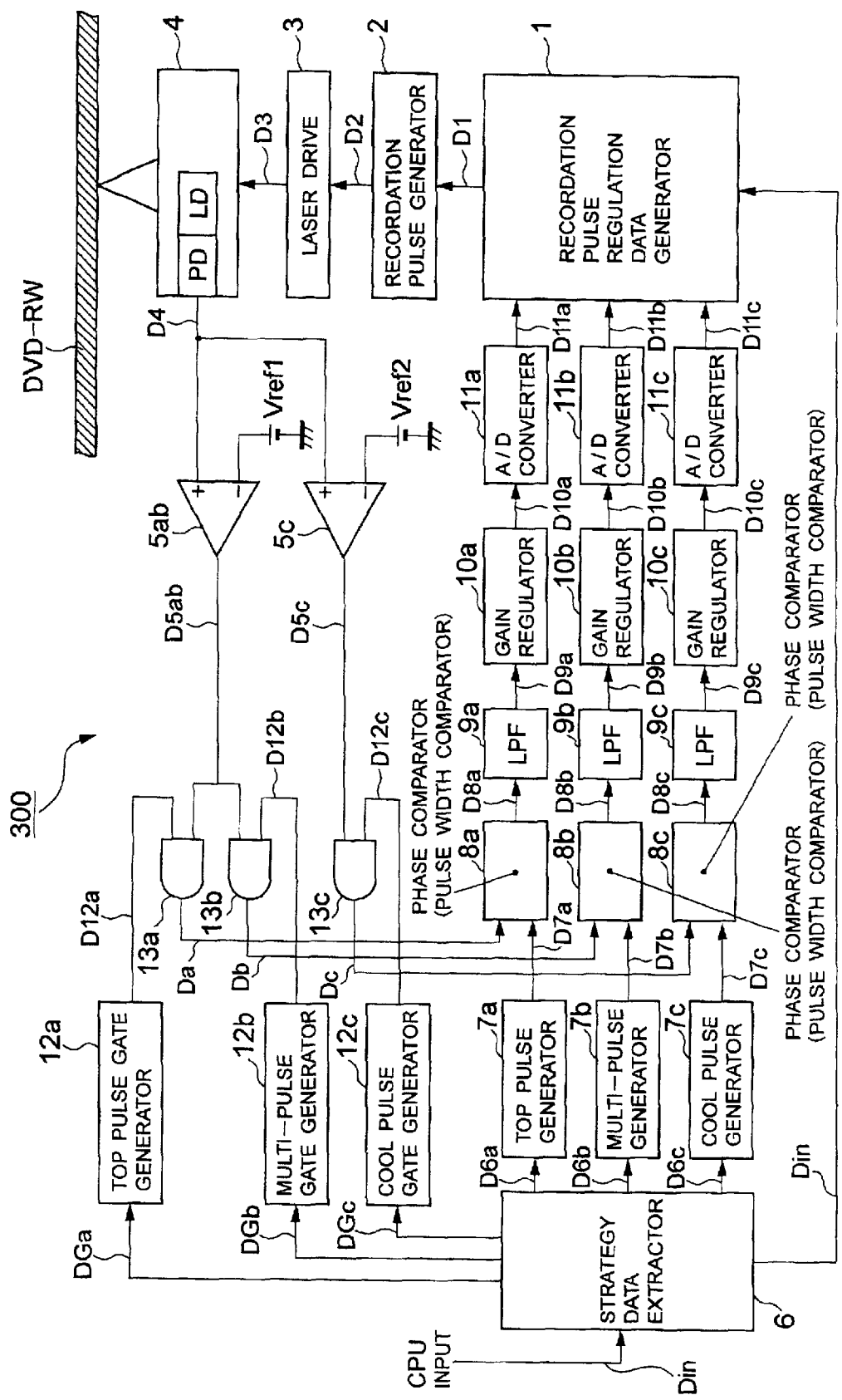
FIG. 11 is a block diagram showing a structure of an optical control circuit according to a third embodiment.

Referring to FIG. 11, illustrated is a block diagram showing a structure of an optical control circuit 300 according to this embodiment. Similar reference numerals are allotted to similar parts and elements in FIGS. 8 and 11. The optical control circuit 300 of this embodiment is adapted to control a write beam to be irradiated onto DVD-RW based on, for example, the write pulse strategy shown in FIGS. 2A and 2B.

A difference between the optical control circuit 300 shown in FIG. 11 and the optical control circuit 200 shown in FIG. 8 lies in that the optical control circuit 300 includes a cool pulse generate 7c in addition to the top pulse generator 7a and multi-pulse generator 7b.

Another difference lies in that a phase comparator 8c, a low-pass filter 9c, a gain regulator 10c and an A/D converter 11c are connected to the cool pulse generator 7c.

Still another difference is provision of a cool pulse gate generator 12c, two binary circuits 5ab and 5c, and an AND circuit 13c.

The strategy data extractor 6 of the illustrated embodiment receives the recordation data Din of the strategy pattern, extracts the top and multi-pulses as shown in FIGS. 15A and 15B, which are included in the recordation data Din, and generates and outputs digital data D6a representing the generation timing, pulse width and amplitude of the top pulse, digital data D6b representing generation timing, pulse width and amplitude of the multi-pulse, and digital data D6c representing generation timing, pulse width and amplitude of the cool pulse.

The cool pulse generator 7c generates only the cool pulse based on the digital data D6c from the strategy data extractor 6 and outputs it as a recordation cool pulse signal D7c. The top pulse generator 7a and multi-pulse generator 7b generate the top and multi-pulses based on the digital data D6a and D6b from the strategy data extractor 6 respectively, and output the resulting signals as the recordation top pulse signal D7a and recordation multi-pulse signal D7b respectively.

The cool pulse gate generator 12c receives cool pulse gate data DGc from the strategy data extractor 6, and generates and outputs a cool pulse gate signal D12c in synchronization with a cool pulse signal D7c based on the cool pulse gate data DGc.

In other words, the strategy data extractor 6 outputs both the digital data D6c and cool pulse gate data DGc, and the cool pulse gate data DGc is a data representing a generation period of the recordation cool pulse signal D7c.

The cool pulse gate generator 12c then produces and outputs the cool pulse gate signal D12c, which becomes a logic "H" in a period WC including the generation period of the recordation cool pulse signal D7c, in compliance with the cool pulse gate data DGc.

The binary circuit 5ab compares the monitoring signal D4 supplied to a non-invert input with a constant reference voltage Vref1 supplied to an invert input, and outputs a binary signal D5ab that becomes a logic "H" when the monitoring signal D4 is higher than the reference voltage Vref1 (D4$\geq$Vref1) and a logic "L" when the monitoring signal D4 is lower than the reference voltage Vref1 (D4<Vref1) as shown in FIGS. 12B and 13A.

The binary circuit 5c compares the monitoring signal D4 supplied to an inversion input with a constant reference voltage Vref2 supplied to a non-inversion input, and outputs a binary signal D5c that becomes a logic "L" when the monitoring signal D4 is higher than the reference voltage Vref2 (D4$\geq$Vref2) and a logic "H" when the monitoring signal D4 is lower than the reference voltage Vref2 (D4<Vref2) as shown in FIG. 14A.

It should be noted that the voltage relationship between the reference voltages Vref1 and Vref2 is Vref1>Vref2. If the voltage level of the monitoring signal D4 obtained upon irradiation of the laser beam of erasure power shown in FIG. 2 is VD4, the relationship of Vref1>VD4>Vref2 is established.

The AND circuit 13a obtains a logical product of the binary signal D5ab from the binary circuit 5ab and the top pulse gate signal D12a so as to generate a binary signal (top detection signal) Da representing the top pulse component included in the binary signal D5ab, as shown in FIG. 12D, and feeds it to the phase comparator 8a.

The AND circuit 13b obtains a logical product of the binary signal D5ab from the binary circuit 5ab and the multi-pulse gate signal D12b to generate a binary signal (multi detection signal) Db representing the multi-pulse component included in the binary signal D5ab, as shown in FIG. 13C, and feeds it to the phase comparator 8b.

The AND circuit 13c obtains a logical product of the binary signal D5c from the binary circuit 5c and the cool pulse gate signal D12c to generate a binary signal (cool detection signal) Dc representing the multi-pulse component included in the binary signal D5c, as shown in FIG. 14C, and feeds it to the phase comparator 8c.

The third route including the phase comparator 8c, low-pass filter 9c, gain regulator 10c and A/D converter 11c has a fundamentally the same structure as the first route including the phase comparator 8a, low-pass filter 9a, gain regulator 10a and A/D converter 11a and the second route including the phase comparator 8b, low-pass filter 9b, gain regulator 10b and A/D converter 11b.

Since the structures of the first and second routes are those as described in the second embodiment, the phase comparator 8a outputs a detection signal D8a, as shown in FIG. 12F, representing a phase difference between the recordation top pulse signal D7a and top detection signal Da, the phase comparator 8b outputs a detection signal D8b, as shown in FIG. 13D, representing a phase difference between the recordation multi-pulse signal D7b and multi detection signal Db, and smoothed data D11a and D11b obtained by smoothing these detection signals D8a and D8b respectively are introduced to the recordation pulse regulation data generator 1.

The phase comparator 8c provided in the third route detects a phase difference between the recordation cool pulse signal D7c and cool detection signal Dc and outputs a detection signal D8c, the low-pass filter 9c smoothes the detection signal D8c and outputs a smoothed signal D9c, the gain regulator 10c amplifies the smoothed signal D9c to a smoothed signal D10c of signal processable level and outputs it, and the A/D converter 11c converts the smoothed signal D10c to digital smoothed data D11c and supplies it to the recordation pulse regulation data generator 1.

Next, an operation of the optical control circuit 300 having the above described structure will be described in reference to FIGS. 12A to 14F and 15A and 15B. FIGS. 12A to 14F illustrate timing charts to show correction processes made to the top, multi- and cool pulses respectively.

As the semiconductor laser LD irradiates the laser beam for information writing according to the drive current D3 from the laser drive 3 at the time of information writing in compliance with the write pulse strategy, the light receiving element PD detects part of this laser beam and outputs the monitoring signal D4 representing the laser beam intensity change as shown in FIG. 12A.

This monitoring signal D4 is compared with the reference voltage Vref1 in the binary circuit 5ab and converted to the binary signal D5ab as shown in FIGS. 12B and 13A before introduced to the AND circuits 13a and 13b. The monitoring signal D4 is also compared with the reference voltage Vref2 in the binary circuit 5c and converted to the binary signal D5c as shown in FIG. 14A before introduced to the AND circuit 13c.

The AND circuit 13a outputs the top detection signal Da representing the logical product of the top pulse gate signal D12a and binary signal D5ab as shown in FIG. 12D, and supplies it to the phase comparator 8a. The AND circuit 13b outputs the multi detection signal Db representing the logical product of the multi-pulse gate signal D12b and binary signal D5ab as shown in FIG. 13C, and supplies it to the phase comparator 8b. The AND circuit 13c outputs the cool detection signal Dc representing the logical product of the cool pulse gate signal D12c and binary signal D5c as shown in FIG. 14C, and supplies it to the phase comparator 8c.

The phase comparator 8a detects the phase difference between the top detection signal Da and recordation top pulse signal D7a and outputs the detection signal D8a as depicted in FIG. 12F. This detection signal D8a is smoothed into the smoothed signals D9a and D10a, converted to the smoothed data D11a and introduced to the recordation pulse regulation data generator 1.

The phase comparator 8b detects the phase difference between the multi detection signal Db and recordation multi-pulse signal D7b and outputs the detection signal D8b as depicted in FIG. 13E. This detection signal D8b is smoothed into the smoothed signals D9b and D10b, converted to the smoothed data D11b and introduced to the recordation pulse regulation data generator 1.

The phase comparator 8c detects the phase difference between the cool detection signal Dc and recordation cool pulse signal D7c and outputs the detection signal D8c as depicted in FIG. 14E. The detection signal D8c is smoothed into the smoothed signals D9c and D10c, converted to the smoothed data D11c and introduced to the recordation pulse regulation data generator 1.

The recordation pulse regulation data generator 1 regulates the top pulse data included in the recordation data Din based on the smoothed data D11a, regulates the multi-pulse data included in the recordation data Din based on the smoothed data D11b, and regulates the cool pulse data included in the recordation data Din based n the smoothed data D11c.

As a result, the compensated recordation pulse data D1 having the regulated period τa at the top pulse end, the regulated period τb at the multi-pulse end and the regulated period τc at the cool pulse end is generated and supplied to the recordation pulse generator 2 as shown in FIG. 15B.

The recordation pulse generator 2 then produces the recordation pulse signal D2 based on the compensated recordation pulse data D1 and feeds it to the laser drive 3, and the laser drive 3 supplies the drive current D3 to the semiconductor laser LD, whereby the semiconductor laser LD emits the laser beam in accordance with the compensated recordation pulse data D1.

As described above, even if the characteristics of the semiconductor laser LD and those of the electronic elements of the optical control circuit 300 vary with the environmental temperature and/or aging, this embodiment regulates the periods τa, τb and τc at the ends of top, multi- and cool pulses by the feedback control and appropriately controls the irradiation period of the semiconductor laser LD with the regulated drive current D3 so as to suppress the thermal interference in the phase change material (recording film) of DVD-RW and form the pit having a proper shape.

In addition, even when the write devices are manufactured using the semiconductor lasers LD having individual differences, the respective semiconductor lasers LD are driven with the drive current D3 adjusted by the feedback control so that the influence of the individual differences is reduced and DVD-RW can have uniform recordation characteristics. Consequently, it is possible to provide the write devices having uniform quality.

Fourth Embodiment

Figure 16:
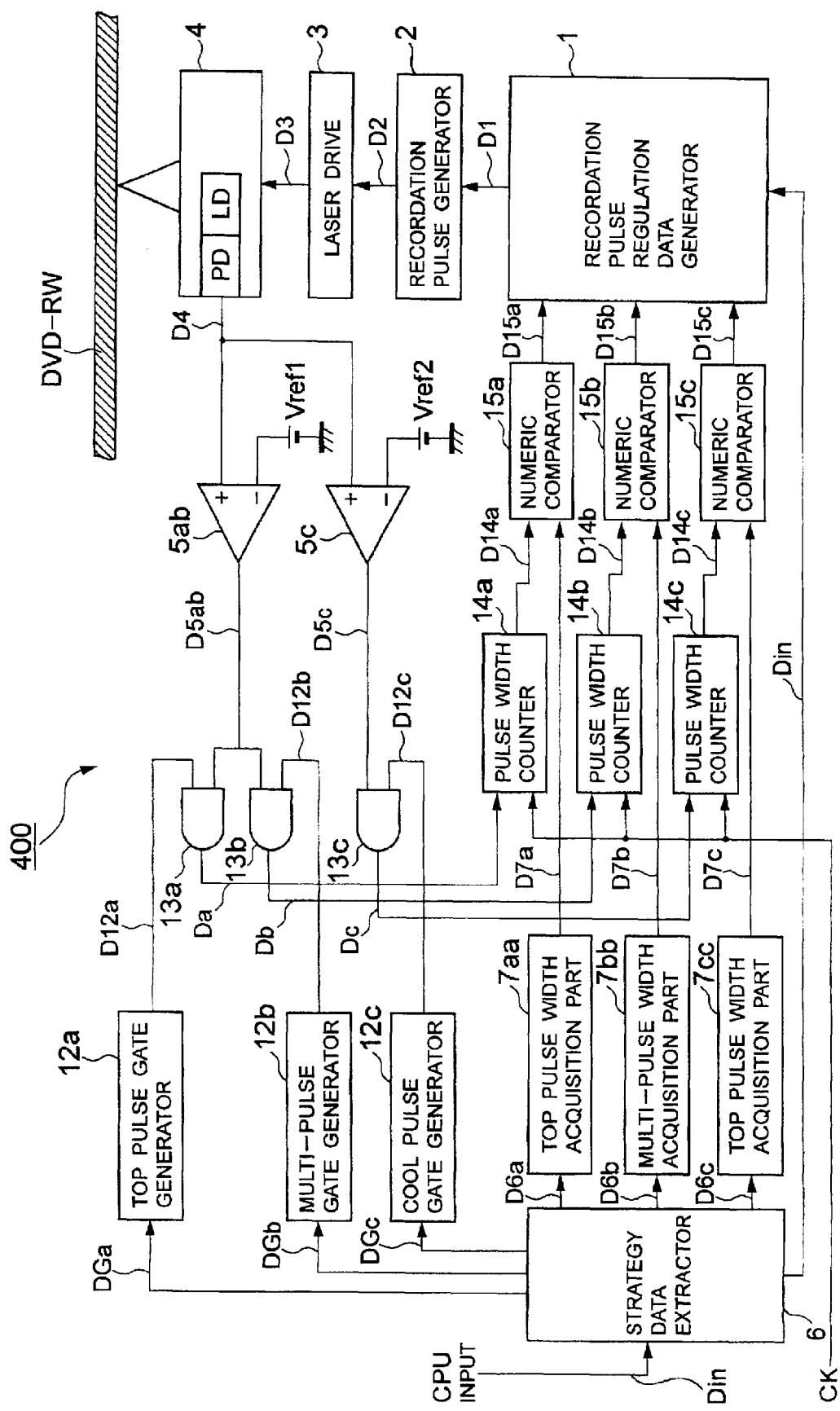
FIG. 16 is a block diagram showing a structure of an optical control circuit according to a fourth embodiment.

A fourth embodiment will now be described in reference to FIG. 16. FIG. 16 illustrates a block diagram showing a structure of an optical control circuit 400 of this embodiment, and similar reference numerals are used to designate similar elements in FIGS. 11 and 16. The optical control circuit 400 performs the light output control in compliance with the write pulse strategy shown in FIG. 2B.

One difference between the optical control circuit 400 of this embodiment shown in FIG. 16 and the optical control circuit 300 shown in FIG. 11 lies in that the top pulse generator 7a, multi-pulse generator 7b and cool pulse generator 7c shown in FIG. 11 are replaced by a top pulse width acquisition part 7aa, a multi-pulse width acquisition part 7bb and a cool pulse width acquisition part 7cc respectively.

Another difference lies in that the phase comparators 8a to 8c, low-pass filters 9a to 9c, gain regulators 10a to 10c and A/D converters 11a to 11c shown in FIG. 11 are replaced by pulse width counters 14a to 14c and numerical comparators 15a to 15c.

The top pulse width acquisition part 7aa obtains data representing the generation timing and pulse width of the top pulse from the digital data D6a representing the generation timing, pulse width and amplitude of the top pulse supplied from the strategy data extractor 6, generates the pulse width data D7a representing the obtained pulse width, and supplies it to the numerical comparator 15a.

The multi-pulse width acquisition part 7bb obtains data representing the generation timing and pulse width of the multi-pulse from the digital data D6b representing the generation timing, pulse width and amplitude of the multi-pulse supplied from the strategy data extractor 6, generates the pulse width data D7b representing the obtained pulse width, and supplies it to the numerical comparator 15b.

The cool pulse width acquisition part 7cc obtains data representing the generation timing and pulse width of the cool pulse from the digital data D6c representing the generation timing, pulse width and amplitude of the cool pulse supplied from the strategy data extractor 6, generates the pulse width data D7c representing the obtained pulse width, and supplies it to the numerical comparator 15c.

Each of the pulse width counters 14a to 14c is a counter for performing calculation in synchronization with a clock signal CK of a predetermined frequency. This clock signal CK is synchronous with the timing the recordation data Din is introduced from the microcomputer system.

The pulse width counter 14a counts a period during which the top detection signal Da (see the top detection signal Da shown in FIG. 12A) supplied from the AND circuit 13a takes a logic "H" continuously, based on the clock signal CK, and supplies count data D14a to the numeric comparator 15a.

The pulse width counter 14b counts a period during which the multi detection signal Db (see the multi detection signal Db shown in FIG. 13C) supplied from the AND circuit 13b takes a logic "H" continuously, based on the clock signal CK, and supplies count data D14b to the numeric comparator 15b.

The pulse width counter 14c counts a period during which the cool detection signal Dc (see the cool detection signal Dc shown in FIG. 14C) supplied from the AND circuit 13c takes a logic "H" continuously, based on the clock signal CK, and supplies count data D14c to the numeric comparator 15c.

Each of the numeric comparators 15a to 15c is a digital subtracter.

The numeric comparator 15a calculates a difference between the numeric data D14a and pulse width data D7a to obtain differential data D15a representing the phase difference between the top detection signal Da and ideal top pulse, and supplies the data D15a to the recordation pulse regulation data generator 1.

The numeric comparator 15b calculates a difference between the numeric data D14b and pulse width data D7b to obtain differential data D15b representing the phase difference between the multi detection signal Db and ideal multi-pulse, and supplies the data D15b to the recordation pulse regulation data generator 1.

The numeric comparator 15c calculates a difference between the numeric data D14c and pulse width data D7c to obtain differential data D15c representing the phase difference between the cool detection signal Dc and ideal cool pulse, and supplies the data D15c to the recordation pulse regulation data generator 1.

An operation of the optical control circuit 400 having the above described structure will be described in reference to FIG. 16.

If the semiconductor laser LD irradiates the laser beam for information writing according to the drive current D3 from the laser drive 3 in order to write information in compliance with the write pulse strategy, the light receiving element PD detects part of this laser beam and outputs the monitoring signal D4 representing the laser beam intensity change as shown in FIG. 12A. The binary circuits 5ab and 5c produce and output the binary signals D5ab and 5c based on the monitoring signal D4 respectively, and the AND circuits 13a to 13c output the top detection signal Da, multi detection signal Db and cool detection signal Dc respectively.

The pulse width counters 14a to 14c count periods during which the top detection signal Da, multi detection signal Db and cool detection signal Dc continuously take a logic "H" respectively such that the count data D14a to D14c are generated representing the pulse widths of the laser beams of the actual top, multi- and cool pulses irradiated from the semiconductor laser LD.

The top pulse width acquisition part 7aa, multi-pulse width acquisition part 7bb and cool pulse width acquisition part 7cc output the pulse width data D7a to D7c representing pulse widths of the ideal top, multi- and cool pulses for comparison to the pulse width count data D14a to D14c.

The numerical comparators 15a to 15c then calculate differences between the pulse width data D7a to D7c and the count data D14a to D14c such that the differential data D15a to D15c are generated representing the phase differences between the pulse widths of the ideal top, multi- and cool pulses and the pulse widths of the actual top, multi- and cool pulse laser beams.

The recordation pulse regulation data generator 1 regulates the top pulse data included in the recordation data Din based on the differential data D15a, the multi-pulse data included in the recordation data Din based on the differential data D15b, and the cool pulse data included in the recordation data Din based on the differential data D15c.

Accordingly, the compensated recordation pulse data D1 having the regulated periods τa at the top pulse end, τb at the multi-pulse end and τc at the cool pulse end is generated as shown in FIG. 15B, and supplied to the recordation pulse generator 2.

Subsequently, the recordation pulse generator 2 generates the recordation pulse D2 based on the compensated recordation pulse data D1 and supplies it to the laser drive 3, and the laser drive 3 supplies the drive current D3 to the semiconductor laser LD, so that the semiconductor laser LD irradiates the laser beam in compliance with the compensated recordation pulse data D1.

As described above, according to this embodiment, even if the characteristics of the semiconductor laser LD and those of the electronic elements of the optical control circuit 400 change with the environmental temperature and/or aging, the end periods τa, τb and τc of the top, multi- and cool pulses are adjusted by the above described feedback control, and the irradiation period of the semiconductor laser LD is appropriately controlled with the regulated drive current D3 so that the thermal interference of the phase change material (recording film) of DVD-RW is suppressed and the pit has a proper shape.

Further, even if the write devices are fabricated using the semiconductor lasers LD having individual differences, the semiconductor lasers LD are driven with the drive current D3 regulated by the feedback control so that the influence of the individual differences is reduced and the recording characteristics to DVD-RW are homogenized. Thus, it is possible to provide the write devices having the same quality.

It should be noted that the first to fourth embodiments deal with the optical control circuits adapted to improve the recording characteristics to DVD-R and DVD-RW, which are typical examples of the information recording media, but the optical control circuit of the present invention is applicable to other information recording medium (optical recording medium and magneto optical recording medium) that can record information optically or magneto optically.

It should be further noted that although the strategy pattern is controlled by compensation when the information is written according to the write pulse strategy in the described embodiments, the optical control circuit of the present invention is widely employable when the write beam pattern should be compensated.

Although the drive current of the semiconductor laser is controlled by compensation in the illustrated embodiments, the present invention is not limited to the semiconductor laser; it is applicable to a case where other light sources should be controlled.

As understood from the foregoing, the apparatus of the present invention detects the write beam actually irradiated onto the information recording media, regulates the period information of the original write information based on the phase difference between the signal representing the actual chronological change of the write beam intensity and the recordation signal corresponding to the original write information to produce the compensated information, and drives the light source based on the compensated information so that even the characteristics of the light source and the elements of the optical control circuit vary with the environmental temperature and/or aging, the influences of the environmental temperature and/or aging are minimized and the light source can be optimally driven. The recording characteristics to the information recording media are therefore improved.

When the information is written according to the write pulse strategy, the present invention can also improve the recording characteristics to the information recording media. It is further possible to improve the recording characteristics by the write pulse strategy control when DVD-R and DVD-RW are utilized as the information recording medium.

This application is based on a Japanese patent application No. 2000-148811 which is hereby incorporated by reference.

What is claimed is:

1. An optical recording apparatus for recording a data pulse signal constituted by consecutive pairs of mark and space on an optical recording medium, comprising:

a drive pulse generator for generating a drive pulse in response to the data pulse signal;

a light source element for generating a write beam in response to the drive pulse; and an optical system for irradiating the optical recording medium with the write beam, wherein the drive pulse generator includes a write pulse generator for generating a write pulse signal based on the data pulse signal, a write beam intensity detector for detecting intensity of the write beam and generating a write beam intensity signal representing the detected intensity, an instruction pulse generator for generating a comparison signal representing a phase difference between the write pulse signal and the write beam intensity signal and for generating an instruction pulse which is obtained by regulating a pulse width of the write pulse signal in response to the comparison signal, and a drive unit for generating the drive pulse in response to the instruction pulse.

2. The optical recording apparatus according to claim 1, wherein the write pulse generator converts each pair of mark and space into strategy data including a plurality of consecutive pulses, and the strategy data is used as the write pulse signal.

3. The optical recording apparatus according to claim 2, wherein the write pulse signal includes a single leading pulse and a number of subsequent pulses corresponding to a mark length.

4. The optical recording apparatus according to claim 3, wherein the strategy data further includes a cool pulse at the end of a number of subsequent pulses corresponding to a mark length.

5. The optical recording apparatus according to claim 3, wherein the write pulse signal further includes a cool pulse at the end of a number of subsequent pulses, and the comparison signal represents three phase differences between the write beam intensity signal and each of the leading, subsequent and cool pulses.

* * * * *